United States Patent
Hanson, Jr. et al.

(10) Patent No.: US 9,862,795 B2
(45) Date of Patent: Jan. 9, 2018

(54) POLYURETHANE/UREA ELASTOMER MATERIAL FOR GAME BALL APPLICATIONS

(71) Applicant: The Hanson Group LLC, Duluth, GA (US)

(72) Inventors: Wallace Lee Hanson, Jr., Duluth, GA (US); Susan Aragon, Loveland, CO (US); Chris Carter, Boulder, CO (US); Charles Demarest, Boulder, CO (US); Michael Oseth, Colorado Springs, CO (US); Marci Ann Seidel, Broomfield, CO (US)

(73) Assignee: The Hanson Group LLC, Duluth, GA (US)

( * ) Notice: Subject to any disclaimer, the term of this patent is extended or adjusted under 35 U.S.C. 154(b) by 79 days.

(21) Appl. No.: 14/716,622

(22) Filed: May 19, 2015

(65) Prior Publication Data

US 2015/0328500 A1    Nov. 19, 2015

Related U.S. Application Data

(60) Provisional application No. 62/000,050, filed on May 19, 2014.

(51) Int. Cl.

| | |
|---|---|
| *C08G 18/10* | (2006.01) |
| *C08G 18/32* | (2006.01) |
| *C08G 18/48* | (2006.01) |
| *C08G 18/70* | (2006.01) |
| *C08G 18/79* | (2006.01) |
| *C08G 18/66* | (2006.01) |
| *A63B 37/00* | (2006.01) |
| *A63B 102/14* | (2015.01) |

(52) U.S. Cl.
CPC .............. *C08G 18/10* (2013.01); *A63B 37/00* (2013.01); *A63B 37/0078* (2013.01); *C08G 18/3206* (2013.01); *C08G 18/4812* (2013.01); *C08G 18/4825* (2013.01); *C08G 18/4829* (2013.01); *C08G 18/4854* (2013.01); *C08G 18/4866* (2013.01); *C08G 18/70* (2013.01); *C08G 18/797* (2013.01); *A63B 2037/0079* (2013.01); *A63B 2102/14* (2015.10)

(58) Field of Classification Search
CPC ............ C08G 18/4866; C08G 18/4812; C08G 18/797; C08G 18/4854; C08G 18/10; C08G 18/4825; C08G 18/4829; C08G 18/70; C08G 18/3206; C08G 18/48; C08G 18/6674; A63B 37/00; A63B 37/0078; A63B 2037/0079; A63B 2102/14

See application file for complete search history.

(56) References Cited

U.S. PATENT DOCUMENTS

| | | | | |
|---|---|---|---|---|
| 4,298,701 | A * | 11/1981 | Meyborg | C08G 18/3237 264/328.14 |
| 4,454,253 | A * | 6/1984 | Murphy | C08G 18/165 264/46.9 |
| 7,247,107 | B1 | 7/2007 | Bedwell | |
| 2011/0028246 | A1 * | 2/2011 | Kimura | A63B 37/0003 473/383 |

OTHER PUBLICATIONS

Huntsman Polyurethanes New Advances in Polymeric MDI Variants; EUROCOAT 2002; Barcelona, Spain; Jun. 2002.*

* cited by examiner

*Primary Examiner* — Rabon Sergent
(74) *Attorney, Agent, or Firm* — Baker & Hostetler LLP

(57) ABSTRACT

Disclosed herein is a composition for use in the preparation of a Lacrosse sport ball, the composition comprising a prepolymer, the prepolymer comprising a multifunctional polyisocyanate and one or more polyols having a molecular weight of from about 1000 Daltons to about 5000 Daltons, and a curative comprising an amine or an additional polyol or a combination thereof. A Lacrosse ball formed from the composition exhibits a ball compression of from about 180 pounds to about 210 pounds or from about 90 pounds to about 210 pounds when tested in accordance with ND 049-12m12 Section 5.3 Ball Compression, and wherein the molded spherical ball exhibits a ball coefficient of restitution COR of from about 0.60 to about 0.70 or from about 0.50 to about 0.75 when tested in accordance with ND 049-12m12 Section 5.4 Ball Coefficient of Restitution COR.

11 Claims, No Drawings

POLYURETHANE/UREA ELASTOMER MATERIAL FOR GAME BALL APPLICATIONS

RELATED UNITED STATES CASES

This application claims priority to U.S. Provisional Patent Application No. 62/000,050, filed May 19, 2014 and entitled "Polyurethane/Urea Elastomer Material for Game Ball Applications." U.S. Provisional Patent Application No. 62/000,050 is hereby incorporated by reference herein in its entirety.

TECHNICAL FIELD

This invention relates to the field of material that can be used to make balls for sporting applications. More specifically, the invention describes material and processes to make products that can be used for the sport of Lacrosse.

BACKGROUND

According to a National Collegiate Athletic Association (NCAA) specification, a ball used in the sport of Lacrosse must contains at least 67 percent rubber. Generally, the remainder of the ball can contain fillers, additives and plasticizers. The materials of the ball can affect ball hardness which can prove troublesome owing to the high speed nature of the sport. During gameplay, the ball might collide with a player or spectator with the potential to cause serious injury. Personal protective gear does provide some protection but the lacrosse ball can frequently contact a player's body at high speeds and forces. The impact of the ball can cause bruises and broken bones. Attempts to ameliorate the damage from impact by a Lacrosse ball are described in U.S. Pat. No. 7,247,107 which describes a lacrosse ball that distributes its impact over a larger surface area by deforming to a much larger degree than conventional solid rubber lacrosse balls. One aspect of the invention describes a lacrosse ball having a hollow interior. This can be a disadvantage when trying to meet weight and volume specifications for a Lacrosse ball.

A second embodiment of the invention describes a lacrosse ball having a soft core and an exterior cover that is harder than the core. Another aspect of the invention describes a lacrosse ball having a dense core and a less dense outer layer over (e.g., over-molded) the dense core. In another aspect of the invention, the outer layer fully encases the dense core. The disadvantage of this invention is its complex structure of the Lacrosse ball and the associated increased manufacturing costs.

SUMMARY

Modification of Lacrosse ball hardness and control of the lacrosse ball during gameplay can be desirable attributes of a Lacrosse ball. The hardness of the ball tends to increase as the ball ages and loses plasticizer. There remains is a need for a Lacrosse ball that does not increase in hardness with age and that has a surface than can facilitate control, or manipulation of the ball, during Lacrosse gameplay while still meeting the athletic equipment requirements for a Lacrosse ball. These and other shortcomings are addressed in the present disclosure.

In an aspect, the present disclosure provides formulas and methods to prepare compositions for using in making athletic equipment balls for various sport activities that overcome the disadvantages of existing balls. In a further aspect, the balls prepared using the compositions described herein can meet the meet specifications in place for the sport activity of Lacrosse.

In one aspect, the disclosure relates to a composition comprising a prepolymer and a curative. The prepolymer can comprise a carbodiimide modified diphenylmethane diisocyanate having a functionality of about 2.2 combined with a polypropyleneglycol diol having a molecular weight of about 2000 Daltons to form a 14% isocyanate prepolymer. The 14% isocyanate prepolymer can be combined with a second polypropylene glycol diol having a molecular weight of about 3000 Daltons to form a 6% isocyanate prepolymer. In further aspects, the prepolymer can be combined with a curative comprising a polyether triol having a molecular weight of about 6000 Daltons and low terminal unsaturation, a polytetramethylene ether glycol diol having a molecular weight of about 2000 Daltons, and 1,4 butanediol to form a polyurethane composition that is free or substantially free of plasticizers. The composition can be formed into a molded spherical ball exhibiting a ball compression of from about 180 pounds to about 210 pounds or from about 90 pounds to about 210 pounds when tested in accordance with ND 049-12m12 Section 5.3 Ball Compression and exhibiting a ball coefficient of restitution (COR) of from about 0.60 to about 0.70 or from about 0.50 to about 0.75 when tested in accordance ND 049-12m12 Section 5.4 Ball COR.

In further aspects, the present disclosure provides a lacrosse ball formed from a composition comprising a prepolymer and a curative wherein, the prepolymer can comprise a multifunctional polyisocyanate and one or more polyols (first polyols) having a molecular weight of from about 1000 Daltons to about 5000 Daltons and the curative can comprise an amine or an additional polyol (second polyol) or a combination thereof. In still further aspects, the composition can be free or substantially free of plasticizers and can be formed into a lacrosse ball exhibiting a ball compression of from about 180 pounds to about 210 pounds or from about 90 pounds to about 210 pounds when tested in accordance with ND 049-12m12 Section 5.3 Ball Compression, and wherein the molded spherical ball exhibits a Ball COR of from about 0.60 to about 0.70 or from about 0.50 to about 0.75 when tested in accordance with ND 049-12m12 Section 5.4 Ball COR.

In another aspect, the disclosure concerns an article prepared according to the methods of forming a composition as disclosed herein. As an example, the disclosure concerns a Lacrosse ball molded from the composition prepared according to the methods disclosed herein.

DETAILED DESCRIPTION

Typically, Lacrosse balls can become harder as the ball ages thereby increasing the chances of serious injury to Lacrosse players or spectators that are hit by the ball. Improvements to reduce Lacrosse ball hardness however can fail to meet athletic equipment specifications for Lacrosse balls. The present disclosure comprises compositions for use in making Lacrosse balls that are less hard while still adhering to the Lacrosse ball athletic equipment specifications. In further aspects, the compositions can be used to form a Lacrosse ball having an adjusted coefficient of friction to enable ease of manipulation of the ball during gameplay.

In an aspect, the present disclosure concerns compositions comprising a prepolymer component and a curative. In a further aspect, the compositions can further comprise an additive. In a still further aspect, the compositions can be free of or substantially free of plasticizers.

In a further aspect, the composition can further comprise additives which can affect physical features of a molded article formed from the composition. In an example, the additives can alter the coefficient of friction of a spherical ball formed from the composition. Alteration of the coefficient of friction can effect manipulation of the spherical ball as it is used in a Lacrosse game. Fillers such as calcium carbonate, clays, or silicas can be added to affect performance properties of the resultant game ball.

Prepolymer

In an aspect, the composition can comprise a prepolymer component. The prepolymer can refer to a monomer or system of monomer that have been reacted to an intermediary molecular mass state. The prepolymer can then be further polymerized by reaction with a curative given the presence of reactive groups in the curative to provide a reacted polymer.

In one aspect, the prepolymer can include an isocyanate of the general formula R—N=C=O (RNCO). The isocyanate prepolymer can react with reactive groups of the curative (amine and hydroxyl) to form a cured polyurethane polymer. Suitable isocyanates can include, for example, isophorone diisocyanate, hexamethylene diisocyanate, toluene diisocyanate (TDI), 4,4'-methylene dicyclohexyl diisocyanate, and methylene diphenyl diisocyanate (MDI). Other isocyanates can include polymeric diisocyanates, modified diisocyanates such as biurets and trimmers, 1,4-phenylene diisocyanate (PPDI), isophorone diisocyanate (IPDI), or a combination thereof. In an example, MDI or TDI can be used to prepare polyurethanes, or urethane polymers.

As an example, the prepolymer can include a carbodiimide modified diphenylmethane diisocyanate (commonly referred to as a modified MDI) as a source of isocyanate. In a further example, the prepolymer can include a carbodiimide modified diphenylmethane diisocyanate having a functionality of about 2.2.

The prepolymer component can also comprise a polyol. As used herein, a polyol, and its derivatives, can refer to a compound having multiple hydroxyl functional groups. The isocyanate can be combined with the polyol to provide the prepolymer component. For example, but not intended to be limiting, the polyol can include compounds of butadiene, caprolactone, polyethers, diols based on polyesters, glycerin, polypropylene glycol, polypropylene glycol polyether or a combination thereof. The polyol can also include diols and triols as well as hydroxyl terminated compounds having more than three hydroxyl groups.

In one aspect, the polyol can comprise one or more polyols of varying molecular weights. In one example, the polyol can have a molecular weight of from about 1000 Daltons to about 5000 Daltons, from about 1000 Daltons to about 10,000, or from about 1000 Daltons to about 50,000. In one example, the polyol can comprise polypropylene glycol having a molecular weight of from about 1000 Daltons to about 5000 Daltons.

In one aspect, the isocyanate can be combined with a first polyol having a molecular weight of about 2000 Daltons to provide a first prepolymer that can be further reacted with a second polyol having a molecular weight of about 3000 Daltons to provide a second, final, prepolymer. As an example, a carbodiimide modified diphenylmethane diisocyanate can be combined with a first polypropylene glycol having a molecular weight of 2000 Daltons to provide a first prepolymer, which can then be reacted with a second polypropylene glycol having a molecular weight of about 3000 Daltons.

In an aspect, about 40 wt. % to about 60 wt. % of the isocyanate can be combined with about 40 wt. % to about 60 wt. % of a first polyol having a molecular weight of about 2000 Daltons to provide a first prepolymer having isocyanate content of from about 10 wt. % to about 20 wt. %. From about 40 wt. % to about 60 wt. % of the first prepolymer can be reacted with about 40 wt. % to about 60 wt. % of a second polyol having a molecular weight of about 3000 Daltons to provide a second final prepolymer having an isocyanate content lowered to from about 5 wt. % to about 15 wt. %. As an example, a first prepolymer having about 14 wt. % isocyanate can be prepared comprising about 54 wt. % of a carbodiimide modified diphenylmethane diisocyanate and about 46 wt. % of a polypropylene glycol diol having a molecular weight of about 2000 Daltons. A combination of about 52% of the first prepolymer and about 48% of a second polypropylene glycol diol having a molecular weight of about 3000 Daltons can be prepared to provide a second, final prepolymer having an isocyanate content of about 6 wt. %.

In another aspect, the prepolymer can comprise amines. An amine can be used as a substitute for all or a portion of the polyol used in the prepolymer as disclosed herein. Exemplary amines can include diamines such a diethyltoluenediamine (DETDA) and dimethyl thio-toluene diamine (DMTDA), as well as a number of other compounds featuring an amine functional group.

Curative

In various aspects, the composition can comprise a curative. The curative can react with the prepolymer to provide a final cured polymer. In an example, the curative can be reacted with an isocyanate prepolymer to form a cured polyurethane polymer.

In one aspect, the curative can comprise a polyol. Exemplary polyols that can be used in the curative include polypropylene glycol, polytetramethylene ether glycol (PTMEG), caprolactone, polybutadiene, polyesters, and glycerin. The curative can comprise a diol, a triol, or a hydroxy terminated compound having more than three hydroxyl groups. In a further aspect, the curative can comprise an amine. For example, the curative can comprise an amine such as 4,4-methylene-bis(2-ethylaniline) (MBOEA), DMTDA, or a secondary aromatic diamine such as Polylink 4200. In some aspects, the curative can comprise a polyol, an amine, or a combination thereof.

In an aspect, the curative can comprise a combination of polyols. The combined polyols can have varying molecular weights. As an example, the curative can comprise a polyether triol, PTMEG, and 1,4 butanediol. The polyether triol can be a hydroxyl group terminated polypropylene glycol triol having a molecular weight of about 6000 molecular and a low terminal unsaturation. Terminal unsaturation can refer to the olefinic unsaturation, or a double bond, for example, at an end group of the organic compound or at the last monomer unit located in a given polymer. The PTMEG can be a hydroxyl group terminated polytetramethylene ether glycol diol having a molecular weight of about 2000 Daltons. In a further example, the curative can comprise about 60 parts of the polyether triol, about 26 parts of the PTMEG, and about 0.45 parts of 1,4 butanediol, the remainder comprising additives where the total composition comprises 100 parts.

Additives

In various aspects, the composition can comprise an additive. The additive can be added to the composition as an addition to the prepolymer component or as an addition to the curative component. The addition of a given additive can affect the properties of the composition as well as the performance of ball formed thereof. Mixtures of optional additives can also be used. For example, the disclosed composition can comprise one or more additional fillers, stabilizers, anti-static agents, impact modifiers, colorant, antioxidant, and/or mold release agents. In one aspect, the composition can further comprises one or more additives selected from a filler, an ultraviolet (UV) absorber, a light stabilizer, and a pigment, or a combination thereof.

In a further aspect, the composition disclosed herein can comprise one or more fillers. The filler can be selected to impart additional impact strength and/or provide additional characteristics that can be based on the final selected characteristics of the polymer composition. In some aspects, the filler(s) can comprise inorganic materials which can include clay, titanium oxide, asbestos fibers, silicates and silica powders, boron powders, calcium carbonates, talc, kaolin, sulfides, barium compounds, metals and metal oxides, wollastonite, glass spheres, glass fibers, flaked fillers, fibrous fillers, natural fillers and reinforcements, and reinforcing organic fibrous fillers. Fillers generally can be used in amounts of 1 to 200 parts by weight, based on 100 parts by weight of based on 100 parts by weight of the total composition. In one example, the composition can comprise a barium sulfate filler.

In some aspects, the addition of a filler can alter the properties of the composition and the Lacrosse ball formed therefrom. As an example, the introduction of certain fillers can affect the coefficient of friction. These changes can in turn affect performance of the Lacrosse ball with respect to the ease of manipulation afforded by the altered coefficient of friction. More specifically, the addition of a silica filler such as a carbinol (hydroxyl) terminated polydimethylsiloxane (for example, Silmer OH Di-50) or a micronized polyethylene-carnuba wax alloy (for example, Shamrock S-232) can be added to the prepolymer component or the curative component to alter the coefficient of friction of the resultant composition and the lacrosse ball formed therefrom.

Ultraviolet (UV) absorbers can also be present in the disclosed thermoplastic composition. The UV absorber can slow oxidation and photodegradation in the composition and in the ball formed thereof. Exemplary ultraviolet absorbers can include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler. In one example, the UV absorber can include $H(OCH_2CH_2)_{6-7}OH$, Chiguard 5530.

In further aspects, light stabilizers can be present in the thermoplastic composition. Exemplary light stabilizers can include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. An exemplary light stabilizer can also include Chiguard 353, a hindered amine. Light stabilizers can generally be used in amounts of from about 0.1 to about 1.0 parts by weight, based on 100 parts by weight of the total composition, excluding any filler.

In some aspects, a colorant or pigment system can be used. Appropriate pigments can be include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Any colorants are generally used in amounts of from 0.1 to 10 parts by weight, based on 100 parts by weight of the total composition, excluding any filler. Further, the pigment can be a UV resistant pigment system in an appropriate carrier such as a polypropylene glycol triol carrier.

In one aspect, the composition can comprise an antioxidant. The antioxidants can include either a primary or a secondary antioxidant. Antioxidants can generally be used in amounts of from 0.01 to 0.5 parts by weight, based on 100 parts by weight of the total composition, excluding any filler.

In various aspects, the composition can be free or substantially free of plasticizer additives. Plasticizers can include phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from about 0.5 to about 3.0 parts by weight, based on 100 parts by weight of the total composition, excluding any filler. A lacrosse ball comprising additional plasticizers can harden over time as the ball ages and plasticizer is lost. Accordingly, a lacrosse ball formed from the composition disclosed herein can be free of or substantially free of plasticizer and thus can be less likely to increase in hardness over time.

Methods, Properties, and Articles

In various aspects, the compositions can be prepared according to a variety of methods. The composition can be prepared through the reaction of the prepolymer component with the curative component. In an example, the prepolymer component and the curative component can be individually heated prior to mixing and before being added to an appropriate mold.

To provide a polyurethane, the prepolymer component, containing an isocyanate, and the curative can be reacted (heated and mixed) in the presence of a suitable polyurethane catalyst. Exemplary polyurethane catalysts can include metal containing compounds such as, but not limited to, dibutyltin dilaurate and bismuth octanoate, as well as other compositions comprising zinc or zirconium. Polyurethane catalysts can also include tertiary amines, such as, for example, 1,4-diazabicyclo[2.2.2]octane (DABCO) and N'N'-dimethylpiperazine. The amount of a given catalyst used can be an amount sufficient to reduce the occurrence of gelation and to reduce the cure time.

In a further aspect, the resulting disclosed compositions can be used to provide any desired shaped, formed, or molded articles. In one aspect, the disclosed compositions can be molded into useful shaped articles by, for example, injection, filling, or foam molding. As noted above, the disclosed compositions are particularly well suited for use in the manufacture of Lacrosse balls. The composition can be used to form a solid casting of a polyurethane Lacrosse ball. As such, according to some aspects, the disclosed compositions can be used to form lacrosse balls that comply with the athletic equipment stipulations prescribed by ND 049-12m12.

To provide a molded polyurethane Lacrosse ball, the prepolymer and curative components can be heated to from about 125° F. and about 150° F. and subsequently degassed. In an example, after degassing is complete, the prepolymer and the curative can be combined in a ratio of about 100:95 (prepolymer:curative). The combined components can be introduced to a spherical mold preheated to from about 180° F. to about 220° F. The filled mold can then be maintained at a temperature of about 180° F. to about 220° F. for a duration of time dependent upon the type of catalyst elected.

In certain aspects, the disclosed compositions can be used to form a spherical ball meeting the specifications for a Lacrosse ball according to ND 049-12m12 for Ball Compression and Ball Coefficient of Restitution (COR). In an example, a molded spherical sample of the disclosed composition can exhibit a ball compression of about 180 pounds to about 210 pounds according to §5.3 of ND 049-12m12 or from about 110 pounds to about 210 pounds according to §5.4 of ND 048-12m12 (revised April 2015). In a further example, the disclosed composition can exhibit a ball COR of from about 0.60 to about 0.70 or from about 0.50 to about 0.75 when tested in accordance with §5.4 Ball COR.

In a yet further aspect, the compositions can be used to prepare a Lacrosse ball that maintains its initial hardness and does not increase in hardness with age. A conventional Lacrosse ball can increase in hardness over a life time of use. As one skilled in the art might appreciate, the presence of a plasticizer in the composition from which the Lacrosse ball is molded can contribute to increased hardening over time. As such, for a Lacrosse ball formed from a composition prepared according to the methods herein, the hardness of the ball can remain consistent over time as the composition is free or substantially free of plasticizer.

In various further aspects, the surface of the Lacrosse ball formed from the composition prepared herein can be manipulated. As one skilled in the art might appreciate, a Lacrosse player can typically control a lacrosse ball in a pocket of a Lacrosse head by utilizing the friction generated between the lacrosse ball and the pocket. The friction can allow a player to move the lacrosse ball to a desired portion of the pocket. Different portions of the pocket can be utilized to handle or throw the lacrosse ball in various desired ways. For example, one portion of the pocket can be best suited for power-cradling the ball. Other portions of the pocket can be best suited for throwing the lacrosse ball in a particular fashion. In addition to these examples, it is understood that various other portions of the pocket can be particularly suited for a variety of other handling or throwing actions based upon the generated friction. As noted, a Lacrosse ball amenable to manipulation in the pocket of the Lacrosse head can be prepared according to the present disclosure. In one example, the Lacrosse ball can be a solid casting from a polyurethane composition disclosed herein. The mold used to achieve the casting can be constructed in a manner to provide a smooth or textured outer surface, thereby affecting friction. In a further example, an additive can be used to alter the Lacrosse ball coefficient of friction to provide the player a better surface to control the ball during gameplay. As noted, an additive such as the silica filler linear polydimethylsiloxane propylhydroxy copolymer (Silmer OH Di-50) or a micronized polyethylene-carnuba wax alloy (Shamrock S-232) can be added to the prepolymer component or the curative component to alter the coefficient of friction of the resultant composition and the lacrosse ball formed therefrom.

Although the preceding description contains significant detail, it should not be construed as limiting the scope of the invention but rather as providing illustrations of the preferred embodiments of the disclosure.

While aspects of the present disclosure can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this disclosure belongs.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. A value modified by a term or terms, such as "about" and "substantially," is intended to include the degree of error associated with measurement of the particular quantity based upon the equipment available at the time of filing this application. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As defined herein, "substantially free of" can mean that a given component is present in an amount of less than about 1 wt. %, specifically less than 0.5 wt. %, more specifically less than about 0.25 wt. %, based on the total weight of all components.

Disclosed are component materials to be used to prepare disclosed compositions as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

As used herein, the term "molecular weight" refers to the "number average molecular weight" or "Mn," which can be used interchangeably, and refers to the statistical average molecular weight of all the polymer chains in the sample and is defined by the formula:

$$Mn = \frac{\sum N_i M_i}{\sum N_i} \quad Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-polysiloxane copolymers, by methods well known to a person having ordinary skill in the art.

EXAMPLES

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

Example 1

A lacrosse ball is prepared from the combination of a prepolymer, an additional polyol and a curative.

The prepolymer (POLY1) is prepared according to the formulation in Table 1.

TABLE 1

Formulation of isocyanate prepolymer POLY1

| Component | Description | Composition (wt. %) |
|---|---|---|
| Modified MDI | methylene diphenyl diisocyanate | 54 |
| PPG 2000 | | 46 |

The prepolymer POLY1 had an unreacted isocyanate content of 14%. POLY1 (52.3%) was then combined with a hydroxy group terminated polypropylene glycol having a molecular weight of about 3000 (47.7%) in a stirred reactor under a nitrogen atmosphere at 150° F. until a desired 6.0% isocyanate content was reached to provide POLY2. The isocyanate content was measured by a standard dibutylamine titration procedure.

A curative CUR1 was prepared according to the formulation on Table 2.

TABLE 2

Formulation for preparation of curative

| Component | Description | Composition (parts by weight) |
|---|---|---|
| PPG-6000 | Polyether triol—6000 Mw | 60.25 parts |
| PTMEG-2000 | Polytetramethylene ether glycol—2000 Mw | 26.40 parts |
| BD | 1,4 butanediol | 00.45 parts |
| UV1 | $H(OCH_2CH_2)_{6-7}OH$ UV Absorber Chiguard 5530 | 06.75 parts |
| STAB1 | Bis (1,2,2,6,6-pentamethyl-4-piperidyl)sebacate Light stabilizer Chiguard 353 | 06.75 parts |
| $BaSO_4$ | Barium Sulfate powder | 04.79 parts |
| COL1 | Pigment | 06.76 parts. |
| | Total | 100 |

The prepolymer and curative were separately heated to 125 to 175 F prior to mixing. A spherical mold part was heated in an oven to 180° F. to 220° F. Dibutyltin dilaurate was added in an amount at 0.0045 cubic centimeters (cc)/100 grams (g) of urethane or 0.0067 cc per 100 g of curative to reduce the gelation and cure times to suit the molding of the product. A silicone mold release agent was applied to the mold parts. The prepolymer and curative were heated to 125° F. to 150° F. and degassed. The prepolymer POLY2 and the curative CURL were then both maintained at 125° F. to 150° F. The prepolymer POLY2 and curative CURL were combined in an amount so that the equivalents of the curative are about 95% of the equivalents of the prepolymer.

The mixture was added to the mold part and the mold part was firmly closed. The filled mold was placed in an oven at 180° F. to 220° F. The mold part was opened after about 15 minutes to 1 hour depending on the rate of reaction desired based on the selection of catalyst amount and the relevant temperatures. The molded part was then placed in an oven at 180° F. to 220° F. for 10 to 19 hours to complete the curing of the polyurethane to provide a spherical Lacrosse ball BALL1.

The spherical ball BALL1 was analyzed according to multiple Lacrosse ball standard procedures for Ball Compression (5.3 Ball Compression (C-D)) and Ball COR (5.4 Ball COR) from the Standard Performance Specification for Newly Manufactured Lacrosse Balls of the National Operating Committee on Standards for Athletic Equipment NOC-SAE DOC (ND)049-12m12.

Test Procedure 5.3 Ball Compression (C-D) of ND-049-12m12 provides that: 5.3.1 Ball compression testing is to be conducted following the procedures in [ASTM] F1888 [Standard Test Method for Compression-Displacement of Baseballs and Softballs] with the following exceptions; 5.3.2 Ball conditioning and laboratory (test room) conditions are to be per section 4; 5.3.3 Place the ball in the compression device to compress the ball with its parting line (if any) approximately parallel to the compression platens; 5.3.4 Activate the compression press until the upper plate is in contact with the ball with less than 0.05 lbs. load applied to the ball; 5.3.5 Take the average of the two diameters measured in section 5.2.1 and compute the distance required to compress the ball to 25% of its average diameter; Compress the ball to a displacement of 25±0.05% at a constant rate of 1 in. per minute±3% and record the load force applied.

The performance requirements for Section 5.3 ball compression are set forth in Section 6.4 providing that the C-D at 25% displacement must be within 195 lbs.±15 lbs. As of April 2015 the new C-D at 25% must be within 160 pounds (lbs.)±50 lbs. BALL1 had an observed Ball Compression in the range of 195 lbs.±15 lbs and within the revised range of 160 lbs.±50 lbs.

Test Procedure 5.4 Ball COR (Coefficient of Restitution) of the ND-049-12m12 provides that: 5.4.1 Ball COR testing is to be conducted following the procedures in [ASTM] F1887 [Standard Test Method for Measuring the Coefficient of Restitution] with the following exceptions; 5.4.2 Ball conditioning and laboratory (test room) conditions are to be per section 4; 5.4.3 The ball-throwing device shall be set to deliver the ball at 60.0±3% mph to the strike plate; 5.4.4 A suitable method for determining the trajectory of the ball while it travels through the light gates before and after impact with the strike plate shall be utilized. Any trajectory deviation determined to be greater than 6 ins. shall be invalid.

The performance requirements for Section 5.4 Ball COR are set forth in Section 6.5. The COR values must be within 0.60 to 0.70. BALL1 had an observed Ball COR in the range of 0.60 to 70.

What is claimed is:

1. A composition formed from:
   a prepolymer, the prepolymer comprising a carbodiimide modified diphenylmethane diisocyanate having a functionality of about 2.2, combined with a polypropyleneglycol diol having a molecular weight of about 2000 Daltons to form an isocyanate prepolymer having 14 wt. % NCO groups, the isocyanate prepolymer having 14 wt. % NCO groups combined with a second polypropylene glycol diol having a molecular weight of about 3000 Daltons to form an isocyanate prepolymer having 6 wt. % NCO groups; and
   a curative comprising a polyether triol having a molecular weight of about 6000 Daltons and low terminal unsaturation, a polytetramethylene ether glycol diol having a molecular weight of about 2000 Daltons, and 1,4 butanediol,
   wherein the composition is free or substantially free of plasticizers, and
   wherein a molded spherical ball of the composition exhibits a ball compression of from about 110 pounds to about 210 pounds when tested in accordance with ND 049-12m12 Section 5.3 ball compression, and wherein the molded spherical ball exhibits a ball coefficient of restitution COR of from about 0.50 to about 0.75 when tested in accordance with ND 049-12m12 Section 5.4 Ball COR.

2. The composition of claim 1, further comprising a filler.

3. The composition of claim 1, wherein the curative further comprises additives.

4. The composition of claim 1, wherein the curative further comprises additives selected from an ultraviolet absorber, a light stabilizer, an antioxidant, or a combination thereof.

5. The composition of claim 1, wherein the curative further comprises an amine.

6. The composition of claim 1, wherein the molded spherical ball is a lacrosse ball and maintains with age a ball compression between 110 pounds to about 210 pounds when tested in accordance with ND 049-12m12 Section 5.3 ball compression.

7. The composition of claim 1, wherein the molded spherical ball exhibits a ball coefficient of restitution of from about 0.60 to about 0.70 when tested in accordance with ND 049-12m12 Section 5.4 Ball COR.

8. The composition of claim 7, wherein the molded spherical ball is a lacrosse ball.

9. A method comprising
combining a carbodiimide modified diphenylmethane diisocyanate having a functionality of about 2.2 with a polypropyleneglycol diol having a molecular weight of about 2000 Daltons to form an isocyanate prepolymer having 14 wt. % NCO groups, and combining the isocyanate prepolymer having 14 wt. % NCO groups with a second polypropylene glycol diol having a molecular weight of about 3000 Daltons to form an isocyanate prepolymer having 6 wt. % NCO groups; and
combining the isocyanate prepolymer having 6 wt. % NCO groups with a curative, the curative comprising a polyether triol having a molecular weight of about 6000 Daltons and low terminal unsaturation, a polytetramethylene ether glycol diol having a molecular weight of about 2000 Daltons, and 1,4 butanediol,
wherein the isocyanate prepolymer and curative are combined in the absence of a plasticizer.

10. The method of claim 9, the method further comprising combining an additive with one or more of the prepolymers or with the curative.

11. The method of claim 9, the method further comprising combining an ultraviolet absorber with one or more of the prepolymers or with the curative.

* * * * *